United States Patent [19]

Parrack et al.

[11] 4,204,279

[45] May 20, 1980

[54] METHOD FOR ENHANCING SEISMIC DATA

[75] Inventors: Alvin L. Parrack, Bellaire; Delbert R. Lunsford, Houston, both of Tex.

[73] Assignee: Texaco Inc., White Plains, N.Y.

[21] Appl. No.: 230,810

[22] Filed: Mar. 1, 1972

[51] Int. Cl.² ............................................. G01V 1/36
[52] U.S. Cl. ........................................ 367/40; 367/43; 367/63; 364/421
[58] Field of Search .................. 340/15.5 DP, 15.5 SC, 340/15.5 CC, 15.5 TD; 364/421

[56] References Cited

U.S. PATENT DOCUMENTS

| | | | |
|---|---|---|---|
| 3,539,982 | 11/1970 | Hileman et al. | 340/15.5 DP |
| 3,550,074 | 12/1970 | Kerns et al. | 340/15.5 DP |
| 3,571,787 | 3/1971 | Backus | 340/15.5 DP |
| 3,629,800 | 12/1971 | Schneider | 340/15.5 CC |

*Primary Examiner*—Howard A. Birmiel
*Attorney, Agent, or Firm*—Carl G. Ries; Thomas H. Whaley; William J. Beard

[57] ABSTRACT

An illustrative embodiment of the present invention includes methods for Seismic Data Processing which may be used to enhance the signal/noise ratio of seismic signals taken by use of the Common Depth Point or Hundred Percent Coverage survey techniques. The methods preserve time alignment and amplitude of the signals while effectively removing the noise therefrom. Small portions of the record centered at a selected time on a selected trace are processed to extract the coherent signal component from the reference trace as determined by comparison with other spacewise adjacent traces. Output records comprising the enhanced signal data and the noise data are produced.

21 Claims, 8 Drawing Figures

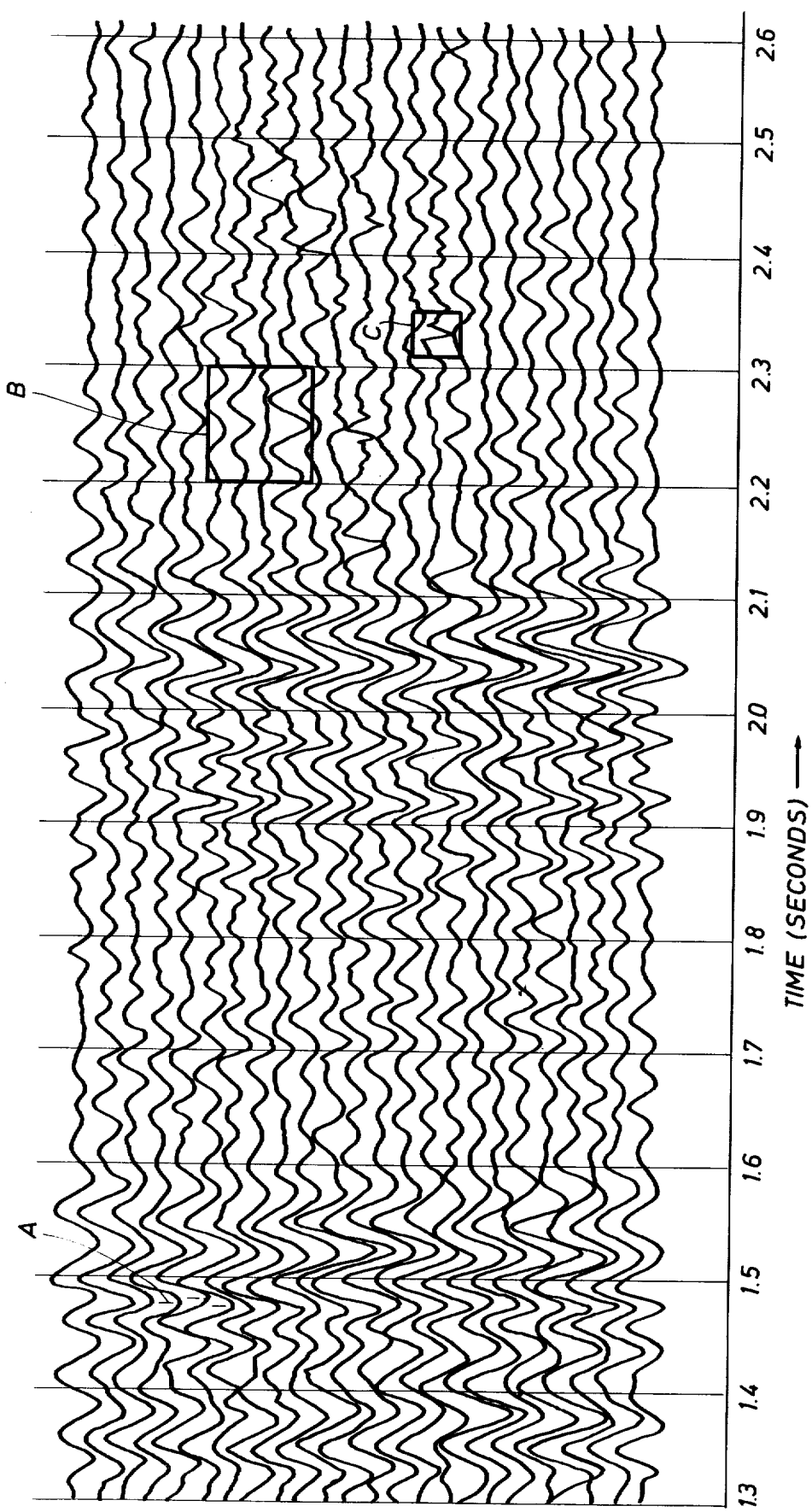
FIG. 2 INPUT RECORD

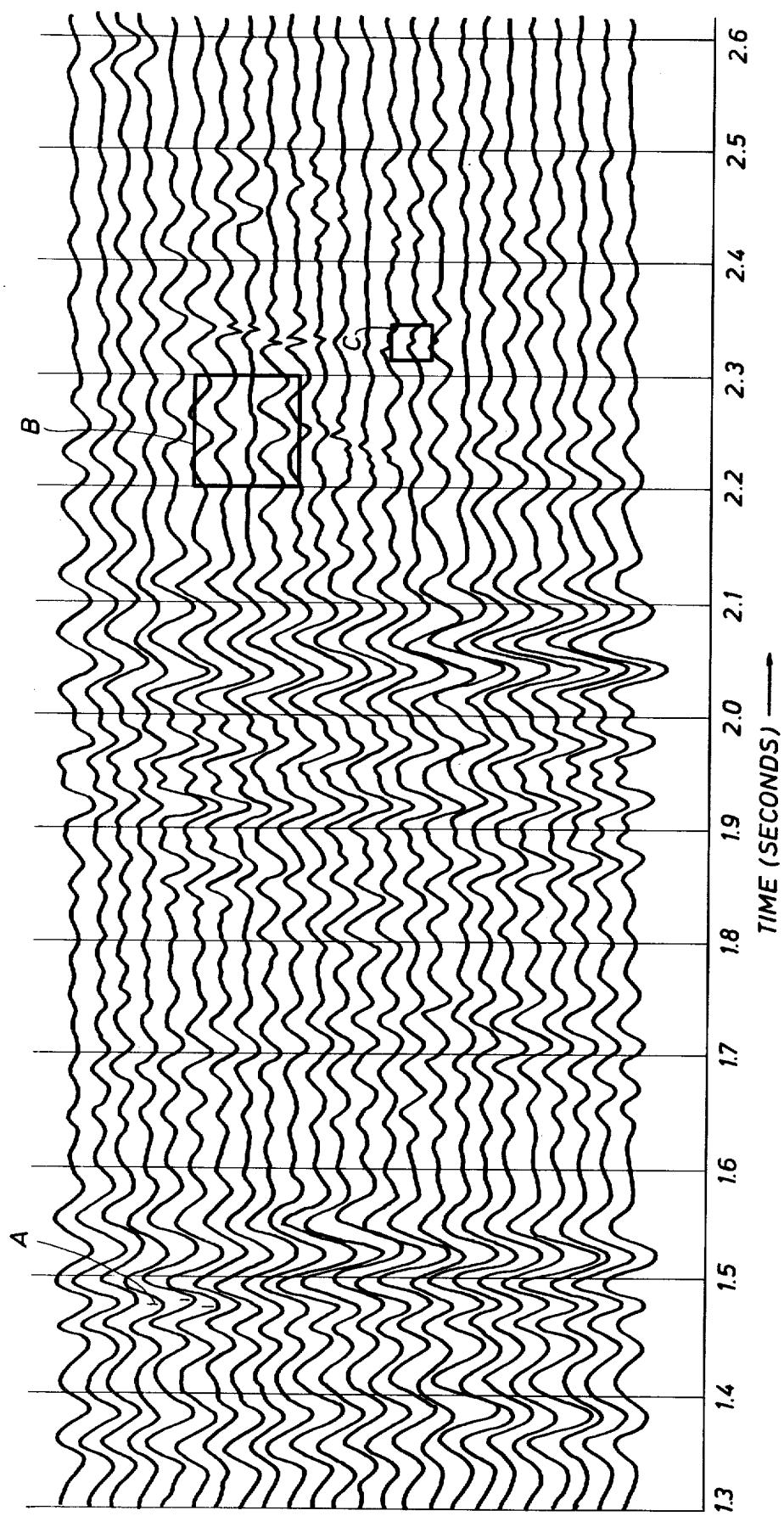
FIG. 3 PROCESSED SIGNAL RECORD

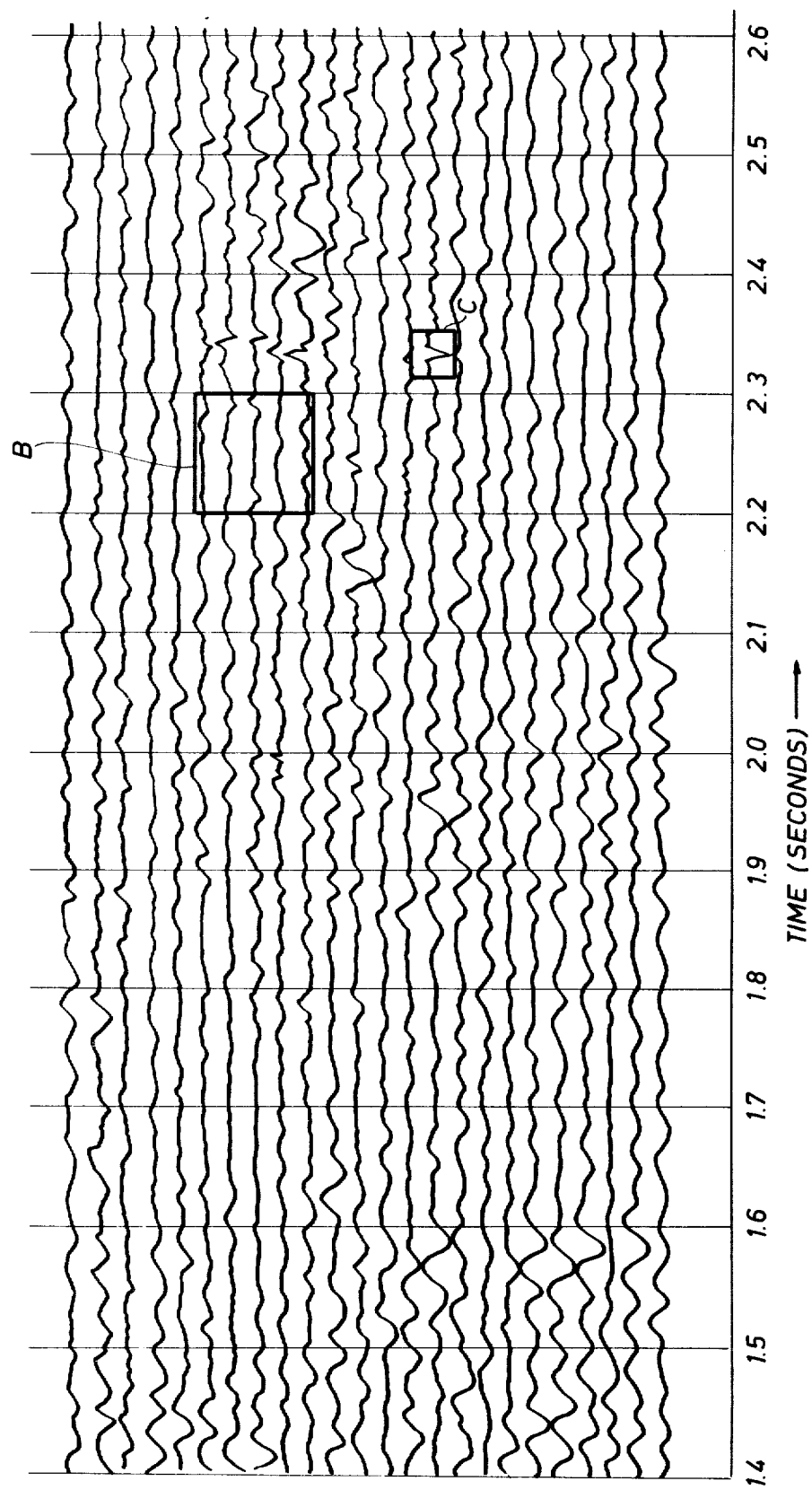
FIG. 4 NOISE RECORD

METHOD FOR ENHANCING SEISMIC DATA

BACKGROUND OF THE INVENTION

This invention relates to the processing of signal information and related time series of such information and more particularly relates to a method for enhancing the signal to noise ratio of seismic exploration data.

The present invention is useful in connection with data gathered in seismic exploration by the well known common depth point shooting technique, the one hundred percent coverage technique or any other seismic data gathering technique. The invention is also applicable to the processing of seismic data derived from the use of nonexplosive seismic energy sources and for the enhancement and analysis of seismic traces forming seismic section displays.

In the process of modern technology's search for petroleum the technique of seismic prospecting is frequently used. In seismic prospecting an acoustic energy source is positioned either on the surface of the earth or in a relatively shallow shot hole and an energy impulse as generated by an explosive or a vibration pattern of preselected shape and frequency content is generated from the source. This acoustic energy penetrates through the multiple layers of material comprising the subterranean portion of the earth. Since the speed of sound is generally different in each layer beneath the surface of the earth, reflections and diffractions of the acoustic energy occur at each interface of such layers. These acoustic energy reflections and diffractions cause energy waves to return toward the surface where they are detected by a plurality of spaced geophones or seismic detectors which generate electrical signals representative of the acoustic energy arrivals at their locations.

The acoustic energy detected by the seismic detectors is generally amplified and then recorded or stored in either analog or digital form on some record medium as a function of time after the seismic shot or energy generation. These data may then be displayed for interpretation in the form of a trace or plot of the amplitude of the reflected seismic energy as a function of time for each of the geophones or group of seismic detectors. Such displays or data may then be processed to interpret the arriving acoustic energy at each seismic detector in terms of the subsurface layering of the earth's structure. This analysis, if performed properly, can disclose the location of subterranean traps which may contain petroleum deposits. Digital data processing equipment is frequently used in such seismic data processing.

The processing of such data has been the subject of numerous patents in the prior art. Several such patents are directed toward enhancing the signal to noise ratio or quality of the signals from the geophones or seismic detectors. This is evidence that noise in seismic data is a problem. One of the primary difficulties in obtaining good seismic data for interpretation is the relative weakness of the electrical signals generated by the geophones or seismic detectors due to reflections, refractions or diffractions in comparison with the noise signals generated at or near the vicinity of the seismic exploration. This noise may be caused by a variety of sources such as surface waves generated in the release of the seismic energy for the exploration. Multiple reflections caused by hard layers near the surface and arriving at the geophone locations simultaneously with the arrival of weaker or relatively weaker seismic reflections from the deeper subterranean formations are also a problem. The appearance of such noise could, if uncorrected, provide erroneous interpretation results of the true seismic data. Of course, other sources of noise such as electronic noise from power lines or communication systems used in the trucks and other equipment used in the seismic exploration, or random acoustic energy noise from other energy sources such as moving vehicles in the region of the seismic exploration may also contribute to this problem.

Accordingly, it is an object of the present invention to provide a method of processing seismic data to enhance the signal to noise ratio of such data.

A further object of the invention is to provide improved data processing methods for removing unwanted noise components from seismic data traces without destroying the information carrying components of the traces.

A still further object of the invention is to provide seismic data processing methods for detecting the coherent features in a seismic trace and for emphasizing the coherent features with respect to the noise contained in the trace.

Yet, another object of the present invention is to provide improved seismic data processing methods wherein the characteristics of adjacent seismic traces are examined for coherent features and the coherent features utilized in turn to selectively discriminate the true seismic signal amplitude from any noise component amplitude present in the traces.

The above and other objects, features and advantages of the invention are provided by seismic data processing methods which operate on common depth point or other seismic data records gathered by the use of either explosive or impulsive energy sources or by vibrator type energy sources to enhance the signal to noise ratio of the traces produced therefrom and to remove the noise portion of the signal from the true coherent feature portion of the signal present on the traces. In the method of the present invention a relatively small portion of a record of seismic traces is examined in each processing increment for coherence by providing a search window which spatially covers from 3 to 9 or more seismic traces across the record and which covers a time interval of adjustable length, but also relatively small with respect to the entire record time length, for any coherent feature present in the traces within this search window. The coherence is detected by a unique cross-correlation technique which includes averaging in the space domain. A particular trace within the search window is defined as a reference trace. The coherent feature of the reference trace and adjacent traces in the window is determined and is used to select the portion of the reference trace which is noise. The noise is then removed from the reference trace and records of both the noise and the coherent signal are provided as outputs from the process. The process is then repeated for other search windows until the entire time duration of each reference trace is so processed. A next reference trace is then chosen and new search windows are provided which are located on this trace. The process is thus repeated until the entire record section of seismic data is processed (i.e., all traces are made reference traces) and the noise removed therefrom.

The methods of the present invention are best understood by reference to the following detailed description thereof when taken in conjunction with the accompanying drawings in which:

BRIEF DESCRIPTION OF THE DRAWINGS

FIG. 2 shows a typical input data record of seismic traces as gathered by a system such as that of FIG. 1.

FIG. 3 shows the same input data record as FIG. 1 after processing by the method of the present invention.

FIG. 4 shows the noise record corresponding to the input data record of FIG. 2 which was removed in the processing of the input data by the method of the present invention.

DESCRIPTION OF THE PREFERRED EMBODIMENTS

Figure 1:
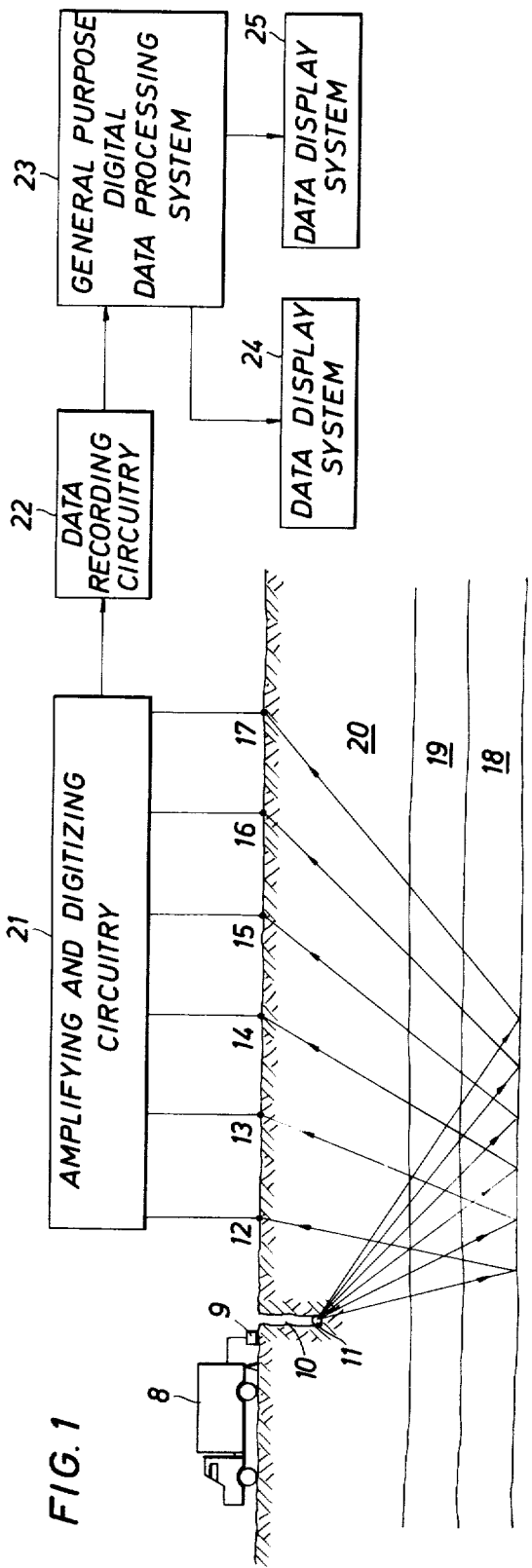
FIG. 1 shows the overall layout of a seismic data gathering system in which the present invention may be utilized.

Referring initially to FIG. 1 a seismic data gathering system used to gather data for oil exploration, which data may be processed according to the methods of the present invention, is shown schematically. An acoustic energy source is shown at 11 of FIG. 1 which may comprise a dynamite charge, if the impulsive variety of acoustic energy source is used, or which may alternatively comprise a seismic equipment truck 8 having a vibrator 9 which is located on the surface of the earth if desired. The dynamite charge 11 is disposed in a shot hole 10 substantially beneath the weathered outer layer of the earth's surface. With either type of acoustic energy source, wave energy is propagated outwardly from the source in the downward direction as indicated by the rays or arrows of FIG. 1. A plurality of seismic detector devices 12, 13, 14, 15, 16, and 17 is shown disposed in spaced relation on the surface of the earth in the vicinity of the acoustic energy source. Detectors 12-17 may each be an array of a plurality of geophones if desired. Energy from the acoustic energy source travels outwardly and downwardly through the various layers 18, 19, and 20 of the earth's subterranean structure and in general is reflected, refracted or diffracted from the interfaces between each pair of such layers. The reflected, refracted or diffracted energy travels upwardly and is detected (or at least the vertical component thereof detected) by the seismic detectors 12-17 which may comprise detectors of the inertia geophone or piezo-electric type commonly known in the art as desired. The upward traveling acoustic energy is converted into electrical signals by the seismic detectors 12-17 and supplied along a plurality of conductors to amplifying and digitizing circuitry 21. This circuitry amplifies the various electrical signals from the geophones or seismic detectors 12-17 in time parallel or in time multiplex form and digitizes such analog electrical signals periodically as a function of time. This apparatus provides a series of digital values of the amplitude of these electrical signals which vary as a function of time in the same manner that the amplitude of the arriving acoustic energy varies at each of the seismic detectors 12-17. The digitized seismic data is then supplied as a function of time to data recording circuitry 22 which typically may comprise digital tape recording apparatus as known and used in the art.

The data recording circuitry 22 generally provides a permanent record on either magnetic disks or tapes of the digitized amplitude data representing the amplitude of the acoustic energy arriving at each of the seismic detectors 12-17 as a function of time. This information may then be supplied, perhaps at a remote location, to a general purpose digital data processing system 23. The general purpose digital data processing system 23 may comprise, for example, a general purpose digital computer system such as the IBM 360 (Model 50, 65, or 75) system, the Control Data Corporation, CDC 6600 Data Processing System, the Univac 1108 Data Processing System or any other suitable general purpose digital data processing system as desired.

The data processing system 23, when programmed in accordance with the methods of the present invention, may then be utilized to enhance the signal to noise ratio of the input seismic data provided on the input record medium by data recording circuitry 22. The enhanced data may then be further processed by appropriate methods programmed in the general purpose data processing system 23 or the enhanced data, after being processed by the methods of the present invention, may be displayed on data display systems 24 and 25 if desired. The display systems 24 and 25 may comprise, for example, chart plotters, cathode ray tube plotters, line printers or any other display apparatus desired which may be driven or supplied from the general purpose data processing system 23 being used.

Referring now to FIG. 2 a portion of a display such as might be provided by data display system 24 or 25 of FIG. 1 of the input seismic data from a plurality of geophones or seismic detectors is shown. The graph or display of FIG. 2 represents a portion of the record of unprocessed signal amplitude data plotted in analog form as a function of time. In FIG. 3 the same seismic data section after processing by the methods of the present invention to remove the noise from the seismic data is shown, again plotted as a function of time. In FIG. 4 the noise which was removed from the data of FIG. 3 by the methods of the present invention is shown displayed as a function of time for the same input data as shown in FIG. 2. If the data of FIG. 3 were combined with the data of FIG. 4 the resultant would be the input record of FIG. 2.

The data processing methods of the present invention for removing noise from the input data to produce enhanced signal to noise ratio seismic data preserves the arrival times and alignment between the coherent signals which exist in the input data. The methods of the present invention also preserve the amplitude and frequency content of coherent signals present in the input data. Incoherent responses and noise, such as surface waves which have a travel time between traces from different seismic detectors which exceed a specified parameter, are eliminated by use of the present invention. The invention operates on the input data by examining a relatively small portion of the data in a processing increment. For example, in FIGS. 2, 3, and 4 a search window such as the area shown and labelled as B in these figures could be processed by the method of the present invention as one such processing increment.

Figure 6:
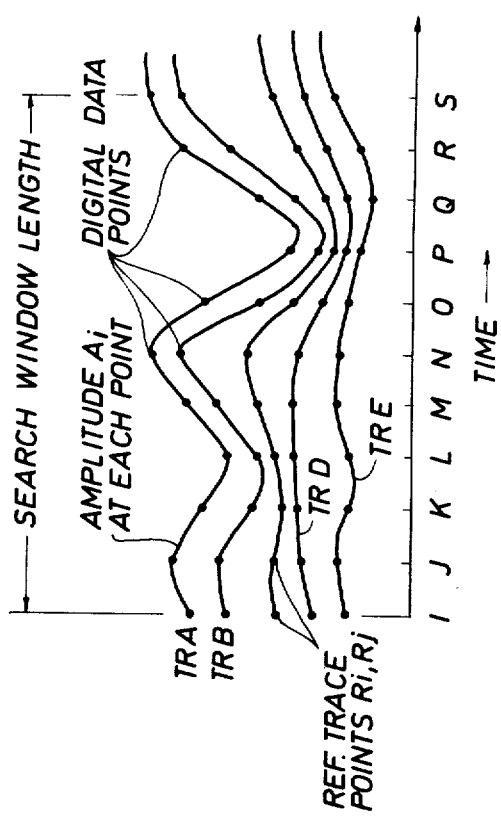
FIG. 6 shows a small portion of a seismic record such as the input record of FIG. 2 in more detail and including just one search window portion of such an input record as used in the present invention.

A plurality of search windows such as search window B of the FIGS. 2, 3, and 4 are processed sequentially until all of the data presented on the input record have been enhanced. Referring now to FIG. 6 a typical search window is shown in more detail. The search window of FIG. 6 has a width of five traces although more could be used if desired. The traces of the FIG. 6 search window are labelled, from top to bottom, trace A, trace B, the reference trace R, and finally near the bottom, trace D and trace E. The amplitude of such traces taken at periodic time intervals as provided in digital form by the data gathering equipment previously described. A digital number is thus supplied on each trace at periodic time intervals, I, J, K, L, M, N, O, P, Q, R and S. These amplitude numbers are represented by the dots at each time interval mark in the search window. In the example of FIG. 6, eleven time points is the length of the search window although this parameter may be varied in practicing the method of the present invention to any desired search window length. It is preferable, however, in order to optimize the number of computer operations used in processing the data for an odd number of data points to be chosen for the window length. It is also preferable for the same reason that the width of the window include an odd number of traces such as the five traces shown in FIG. 6. This may be extended to 7, 9, 11 or more traces which are processed simultaneously if desired.

Figure 7A:
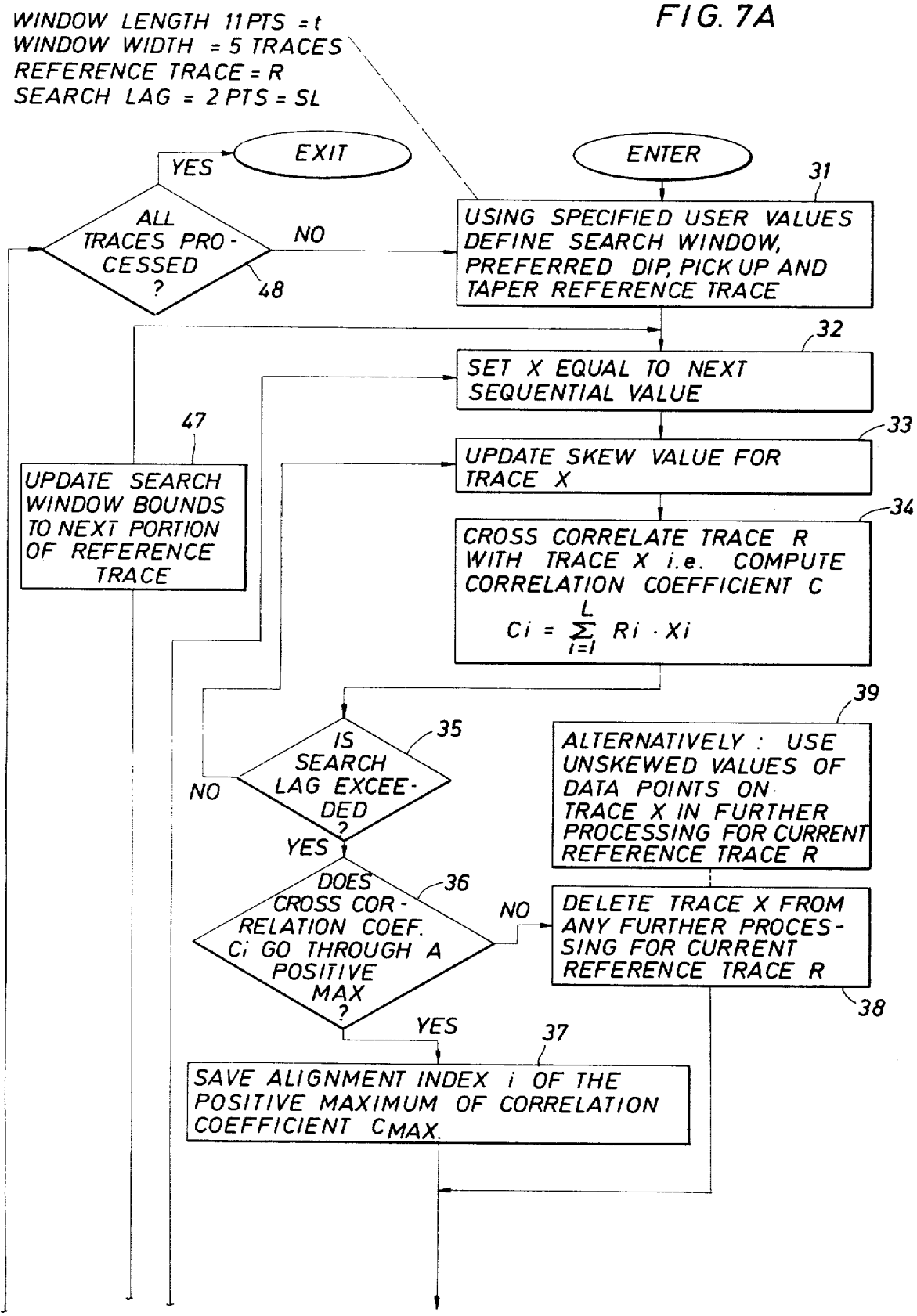
FIGS. 7A and 7B show the logic flow or flow chart of a digital computer program implementing the data processing method of the invention.
Figure 7B:
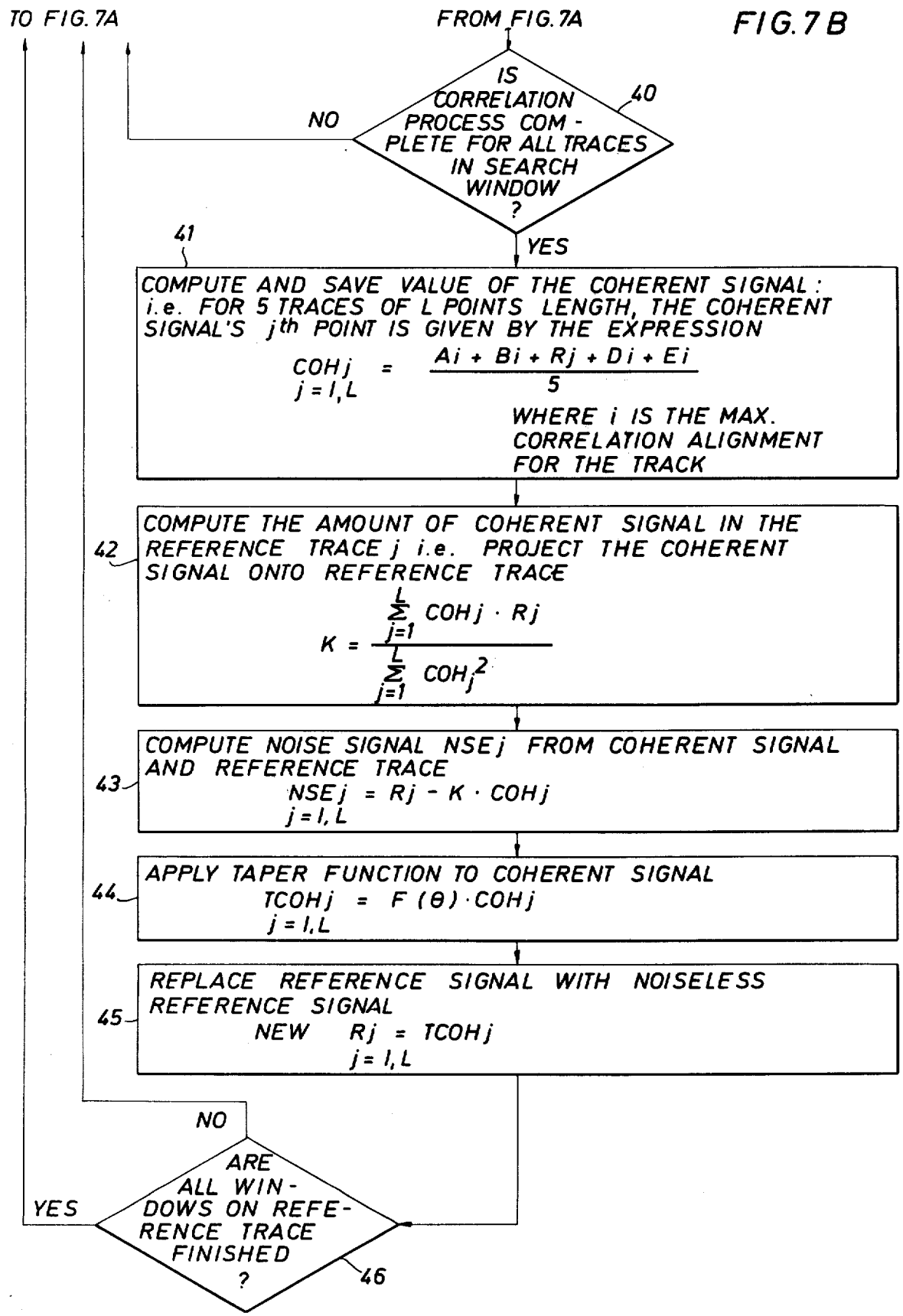

Referring now to FIGS. 7A and 7B, a flow chart or logic flow diagram for a digital computer program for performing the data enhancement method of the present invention as shown. The notations used in the flow chart of FIG. 7 refer to the traces shown in the example search window of FIG. 6. The computer program implemented by the flow chart of FIG. 7 may be thought of as a subprogram in a larger seismic data processing programming system which is utilized within general purpose digital data processing system 23 of FIG. 1. Such a subprogram could be entered or called whenever appropriate by the programming system, such as upon receipt of a signal denoting completion of an input data record from the data recording circuitry 22 of FIG. 1. In the example to be described the processing of one record such as a record of the type of FIG. 2 is contemplated, but it will be appreciated by those skilled in the art that many such data records could be processed by the program of FIGS. 7A and 7B in a sequential manner whenever the input data are available to the general purpose data processing system.

The input seismic data records as shown in FIG. 2 have corresponding seismic events more or less aligned in a straight line manner on the input traces with such lines being nearly vertical (as viewed with a horizontal time scale). This appearance is characteristic of data which has been corrected for "moveout" such as "processed" CDP or common depth point data. The details of such moveout corrections are well known in the art and will not be discussed in detail. It will suffice to say that in raw form the recorded data has corresponding seismic reflection events occurring along the arcs of curves as the distance of the seismic detector (such as 12, 13, 14 etc. of FIG. 1) from the shot point increases. These curves are usually assumed to be hyperbolic in nature with the focus of the hyperbola of a given event (or reflector) and the shape of the hyperbola being determined by the relative detector spacing and the dip of the reflector. In CDP shooting, moveout corrections for detector to shot point spacing are made and several redundant traces (i.e., those with reflections from the same subsurface bed area) are added together or "stacked" to improve the signal to noise ratio. This results in the vertical alignment of corresponding "events" or coherent features on adjacent traces on processed records as in the input record of FIG. 2.

The present invention may, however, be used with equal facility in the case of input data comprising raw records from CDP shooting (i.e., unstacked and non-moveout corrected) or raw data records taken with the 100% coverage technique (no redundant reflections from subsurface reflection points). For example, it is possible to process raw CDP data (before moveout and stacking) using the techniques of the present invention by operating on common range traces (those having the same shot point to detector spacing) from several raw data records. In such a case (i.e., using common range traces) the coherent features or events will align vertically (or nearly so) in the manner of the processed CDP data of FIG. 2. Data taken by the 100% coverage method can be processed in the same manner. Also, if it is expected that the input data will contain events resulting from a particular bed or reflector or series of reflectors having a dip (thus making processed CDP events appear along a sloping rather than a vertical line) this preferred dip can be used as an additional input to the program implementing the methods of the invention and the input data can be mathematically skewed or biased along this preferred direction before applying the methods of the invention. It will thus be appreciated that, although the processing steps to be described are for an example in which preference is given to vertically occurring coherences or events, these techniques are also applicable in other than plane parallel bed, moveout corrected cases.

Upon entry into the program described by the flow chart of FIG. 7A by appropriate program calling sequences from the data processing system, the first processing step which is specified at block 31 of the flow chart is to define the search window boundaries relative to the data using the parameters specified by the user for the window length and width to be used. In the present example we will refer to the window of FIG. 6 having a length of 11 points and a width of 5 traces. This window may be thought of as being centered on the center point of trace R (the reference trace) of FIG. 6. The reference trace R is then processed by tapering (multiplication by a taper function) to allow more weight to be given data points near the center of the window in the subsequent processing. This "tapering" process will be described in more detail subsequently.

The program then proceeds to set a computational parameter X (at block 32), which represents the trace being compared to the reference trace R for coherence at a given time, equal to its initial value. The sequence for this comparison could be any desired sequence of the four adjacent traces to R. It has been found preferable, however, to use the sequence $X=B$, $X=A$, $X=D$ and $X=E$ in the case of the data of FIG. 6 in the coherence alignment procedure to be described.

To compare the currently specified adjacent trace X with the reference trace R for coherence, a series of cross-correlation computations is performed between the reference trace and the adjacent trace. This operation is begun by mathematically skewing the adjacent trace X to the left by an initial amount equal to the search lag SL (in the case of FIG. 6, $SL=2$ data points) in time. The search lag SL is the amount of time shift to be allowed in the correlation process. The search lag extends either to the left or right in time as will be subsequently described in more detail. This operation is indicated at block 33 of FIG. 7A. By appropriate choice the search lag SL may be chosen to prevent spurious alignment of the reference trace R and trace X on multiples, or to avoid coherence alignment with other seismic events having large time "step out". If a preferred dip angle has been specified by the user this would, of course, be added to the search lag parameter SL for the following computations.

When the proper skew is obtained at block 33, the program proceeds, at block 34, to cross-correlate the skewed trace X with the reference trace R by computing the correlation coefficient $C_i$ corresponding to this alignment as indicated. A test is then performed, as indicated at block 35, to determine if the search lag has been exceeded. If the search lag has not been exceeded the program loops back to block 33, updating the alignment index i, to repeat the cross-correlation of trace X and the reference trace.

When all correlations in the range of the search lag have been performed the correlation cofficients $C_i$ are tested at block 36 to determine if the $C_i$ go through a positive maximum. If the $C_i$ coefficients do have a positive maximum this means that a coherence having a positive amplitude exists in the search window between the reference trace and the adjacent trace X just examined. If this condition occurs the program saves the alignment index value i at which the $C_i$ maximum occurs and proceeds to block 40. If a positive maximum of the correlation coefficients $C_i$ does not occur then alternative procedures as described at blocks 38 and 39 can be followed. At block 38 one alternative (i.e., that of deleting this portion of trace X from further processing) is described. At block 39 the alternative of using the data points of trace X which lie within the search window in its unskewed position (i.e., in time alignment with the reference trace) is described. The condition of finding no positive maximum of the correlation coefficients $C_i$ indicates, in some sense, a deficiency in the data of trace X in the correlation comparison with the reference trace. The trace X data may be too noisy, too smooth or too time skewed to correlate well with the reference trace R. Of course these same things could be wrong with that portion of the reference trace R in the search window, also. By following one of the two alternatives at block 38 or block 39 the unusual data from trace X is appropriately utilized in the processing.

In any event, the program then proceeds to block 40 where a test is performed to determine if all adjacent traces in the search window have been examined for correlation with the reference trace R. If not the program loops back to block 32 where X is updated to the next adjacent trace to be correlated in the sequence previously described (i.e., B, A, D, E). If a coherence alignment was noted, say between trace B and the reference trace R, then on the next correlation attempt any shift in the time alignment of coherence so noted is extrapolated to the next trace when it is examined for correlation with the reference trace R. For example, if a time alignment of one left shift produced a coherence maximum between trace B and trace R, then the effective left edge of the search window is placed at this same time shift location on trace R before cross-correlating with trace A would begin. The search lag would then extend two additional points to the left of this new window left edge. This process allows gentle dips to be followed more easily than if strict vertical coherence is required in the process.

When the test at block 40 passes through the "yes" branch all adjacent traces in the window have been examined for coherence with the reference traces and their alignments have been found. The program is then prepared to define the coherent signal and to extract this coherent signal from the combined signal+noise present on the input reference trace data. The coherent signal is determined by the method shown in block 41. That is, a linear average of the data points of the aligned traces A, B, D and E with the reference trace R is computed at each data point j of the reference trace. It should be noted that the coherent signal produced by this process is always time aligned with the reference trace R within the search window. This prevents spurious event shifting as caused by mixing or stacking techniques as used in the prior art.

The program then proceeds, at block 42, to determine the amount of coherent signal which is present in the reference trace R by computing the least squares coefficient K as indicatd. It may be shown that K is actually the coefficient of best least squares fit of trace R to the coherent signal COH which minimizes the square of the difference of each data point on these two traces from each other. This may be thought of as providing a quantitative measure of the amount of coherent signal present in the reference trace R.

When K has been determined the amount of noise present at each point $R_j$ of the reference trace R may be computed as indicated at block 43. This simply subtracts the amount of coherent signal present at each point (i.e., K: $COH_j$) from the total signal (i.e., $R_j$) at each point. What is left after the subtraction at each point is thought of as the noise component $NSE_j$ at that point on the reference trace.

Figure 5:
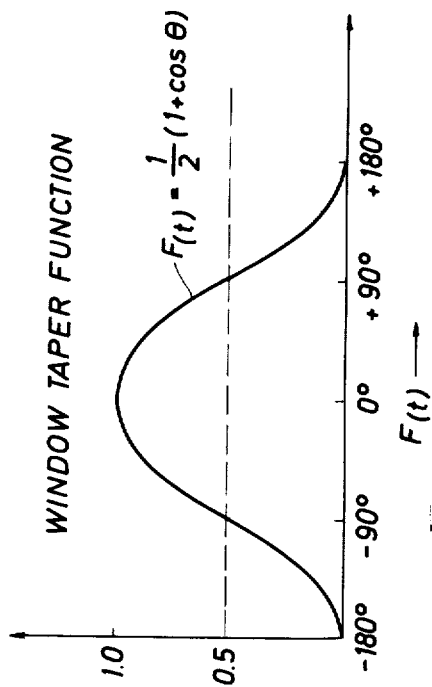
FIG. 5 shows a typical window taper function as utilized in the present invention.

A taper function F ($\theta$) is then applied to the coherent signal to permit smooth transition at the boundary of the search window. An example of such a function is illustrated in FIG. 5. Referring momentarily to FIG. 5, a window taper function, as referred to in block 44 of the flow chart is illustrated schematically. A function of time which is given by the relationship $$F(t) = \tfrac{1}{2}(1 + \cos \theta) - 180° \leq \theta \leq +180° \qquad (1)$$

is used. The parameter $\theta$ here represents the time interval of the search window. The purpose of applying the taper function to the data points in the window by multiplication is to provide a smooth transition in processing data from one search window area to the next. It will be observed, for example, that the taper function of FIG. 5 smoothly goes to zero at either end of the search window. Thus, adjacent search windows are assured of meeting and having continuity at their edge boundaries. Applying the taper function of FIG. 5 to the data of the search window also has the effect of allowing a greater contribution to the analysis of coherence from points well within the window rather than allowing equal influence from data points near the ends of the search window. The horizontal or time scale of FIG. 5 is graduated in degrees from minus 180° to plus 180° with the understanding that points spaced in time by their periodic interval as illustrated in FIG. 6 are chosen which are analogous to the appropriate degree markings of FIG. 5 for computing the value of Cos $\theta$.

The final step in processing the data on a reference trace R in one search window is indicated at block 45. This is to replace the reference signal value at each data point with the tapered value of the coherent signal which is derived as indicated above. The incoherent noise as represented by the values $NSE_j$ computed at block 43 is also available for analysis or display if desired. The data points derived from block 45 and the noise points derived from block 43 would then, if plotted separately, yield the traces of FIGS. 3 and 4 respectively.

When enhanced reference signal values are computed, the program proceeds with the test at block 46 to determine if all search windows on the reference trace are finished. If all search windows are complete and if all traces in the data record are processed as indicated by the test at block 48 then the program has completed its processing of the data for the entire record section and the exit branch is taken. If there still remain reference traces to be finished within the record section or if additional search windows remain to be finished on a particular reference trace then the program moves on to a new reference trace. If a new search window displaced in time on the same reference trace from the one just finished is to be processed, then this is done at block 47. In either case the program loops back to complete all search windows and all reference traces in this manner by looping back to either block 32 or block 31 as appropriate.

In this manner a plurality of search windows are generated and the data within each search window is processed to produce one enhanced reference trace which is associated with each of the search windows. The enhanced trace contains only the coherent features of the data in the window. Due to the use of the taper function of FIG. 5 the processed data from adjacent search windows are assured a continuous boundary at the edge of the search windows. The process is repeated until each trace has become a reference trace and the entire record section of data is complete.

Referring now to FIGS. 2, 3, and 4 the similarity of the amplitude of the signals displayed in box B of FIGS. 2 and 3 should be observed. This gives a good indication of the amplitude preservation of signals which are enhanced using the method of the present invention. Also, in FIGS. 2 and 3 the marks indicated by the slashes labelled A in FIG. 2 indicate the relative time alignment of a similar event on three traces. The preservation of this time alignment in the processed signal record of FIG. 3 indicates that time alignment is maintained also by the method of the present invention. In the small block labelled C in FIG. 2 on the input data record a small noise spike appears on one trace. The effect of the method of the invention on smoothing or eliminating this noise spike is observed in FIG. 3 of the processed signal record. This incoherent noise spike shows up very markedly in the block labelled C of FIG. 4, the noise record. This is an indication of how effective the method of the present invention is at removing the incoherent noise and leaving the coherent portion of the signal by the process. Summarizing, it is apparent that the process of data enhancement of the present invention preserves the amplitude and time alignment of signals while effectively removing the noise and preserving the coherence of events occurring in the seismic data.

It will be appreciated that the foregoing may make other embodiments of the basic method of the present invention apparent to those skilled in the art. It is the intention to cover all such changes and modifications as come within the true spirit and scope of the present invention in the appended claims.

We claim:

1. A machine implemented method for enhancing digital data in a seismic record, said data having a coherent signal component comprising a measure of the similarity between spatially related time series data, and a noise component, and for improving the signal to noise ratio thereof, comprising the steps of:
   determining, for a search window defined about a selected time on a selected seismic reference trace, the coherent signal associated with said reference trace and a plurality of adjacent seismic traces;
   computing, by use of said coherent signal, the component of said coherent signal extant in said reference trace and replacing in time alignment with said reference trace on an output signal record medium, that portion of said reference trace included in said search window with said component of the reference trace comprising said coherent signal portion;
   replacing, in time alignment with said reference trace on an output noise record medium, that portion of said reference trace included in said search window, with the remainder of said reference trace which does not comprise said coherent signal portion; and
   repeating the above steps for other selected times and other selected reference traces until all data comprising said record is so processed.

2. The method of claim 1 wherein the step of determining the coherent signal associated with the portion of said selected reference trace in said search window includes:
   cross-correlating selected portions of a plurality of adjacent seismic traces with the portion of said reference trace in said search window and deriving a cross-correlation coefficient C for each such process;
   time skewing said adjacent traces with respect to said reference trace into a plurality of preselected time positions and repeating the cross-correlation step for each adjacent trace at each such alignment;
   determining for each adjacent trace the time alignment which produces a maximum of the computed cross-correlation coefficients C;
   computing, as a function of said maximum coefficient time alignments between said reference trace and said adjacent traces, the coherent signal.

3. The method of claim 2 wherein the step of computing the coherent signal includes;
   computing at each digital data point in said search window on said reference trace, the coherent signal data points comprising the linear average of said reference trace data points and the time skewed adjacent trace data points falling in time alignment with the data points on said reference trace in said search window.

4. The method of claim 2 wherein, prior to said cross-correlating step, said selected reference trace and said adjacent trace digital points are operated on by a mathematical operator to taper them smoothly to zero value at the edges of said search window, thereby allowing less influence on the cross-correlation step from data points near the edges of said search window.

5. The method of claim 4 wherein the mathematical taper operator F $(\theta)$, used is of the form $$F(\theta) = \tfrac{1}{2}(1 + \cos \theta) \quad -180° \leq \theta \leq +180°$$

where $\theta$ represents the time dimension parameter of a seismic trace in said search window.

6. The method of claim 2 wherein the step of time skewing said adjacent traces into a plurality of preselected time positions with respect to said selected reference trace and repeating the cross-correlation of said selected reference trace and said adjacent traces at each skewed time position additionally includes further time biasing the data points on said adjacent traces to produce cross-correlation of said selected reference trace and said adjacent traces along a preferred time delay corresponding to a preselected dip angle.

7. The method of claim 1 wherein all steps are repeated iteratively, more than once, thereby further enhancing the data on each such application.

8. The method of claim 1 wherein the step of replacing, in time alignment with said selected reference trace on an output signal record medium, that portion of said selected reference trace included in said search window, with the component of said selected reference trace comprising said coherent signal portion includes operating on said coherent signal portion with a mathematical operator to taper the data points comprising said coherent signal portion smoothly to zero value at the edges of said search window, thereby allowing a smooth transition of data from one search window area on said selected trace to adjacent search window areas on said selected trace.

9. The method of claim 8 wherein the mathematical taper operator F ($\theta$) used is of the form $$F(\theta) = \tfrac{1}{2}(1+\cos\theta) \quad -180° \leq \theta \leq +180°$$

where $\theta$ represents the time dimension parameter of a seismic trace in said search window.

10. A machine implemented method for enhancing digital data in a Common Depth Point, moveout corrected and stacked seismic data record, said data having a coherent signal component comprising a measure of the similarity between spatially related time series data, and a noise component, and for improving the signal to noise ratio thereof, comprising the steps of:
  determining, for a search window defined about a selected time on a selected seismic reference trace, the shape of the coherent signal associated with said selected reference trace and a plurality of spacewise adjacent seismic traces;
  determining, for said search window, the amplitude of said coherent signal;
  computing, as a function of the amplitude and shape information pertaining to said coherent signal, the component portion of said selected reference trace corresponding to said coherent signal;
  replacing, in time alignment with said selected reference trace, on an output signal record medium, the portion of said selected reference trace in said search window, with said coherent signal component portion; and
  repeating the above steps for other selected times and other selected reference traces until all data comprising said record is so processed.

11. The method of claim 10 and further including the step of, prior to performing the repeating step:
  replacing, in time alignment with said reference trace on an output noise record medium, that portion of said reference trace included in said search window, with the remainder of said reference trace not comprising said coherent signal component portion.

12. The method of claim 10 wherein the step of determining the shape of said coherent signal is performed by:
  cross-correlating a plurality of adjacent seismic traces X with the portion of said reference trace R in said search window and deriving a correlation coefficient $C_i$ according to the relationship $$C_i = \sum_{j=1}^{L} R_i \cdot X_i$$

where the index $j=1$, L represents the number of digital data points on the reference trace R and the adjacent trace X in said search window, and the index i represents the i th such cross-correlation;
  time skewing each of said adjacent traces X with respect to said reference trace into a plurality of preselected time alignments and repeating the cross-correlation step for each adjacent trace X at each such time alignment;
  determining, for each adjacent trace X the time alignment which produces a maximum of the computed cross-correlation coefficients $C_i$ for a given adjacent trace X; and
  computing, as a function of said maximum coefficient time alignments for each adjacent trace X and of said reference trace R, the coherent signal component COH.

13. The method of claim 12 wherein the step of computing the coherent signal associated with said traces is performed according to the linear average relationship $$COH_j = \frac{A_i + B_i + R_j + D_i + E_i + \cdots\cdots}{N}$$

where the index i represents the index of the time alignment of each adjacent trace X=A, B, D, E - - - - - which produces said maximum correlation coefficient C for that adjacent trace, the index j represents the j th data point in said search window on the reference trace R and the coherent signal COH, and N represents the integer number of the traces in the numerator including the reference trace R.

14. The method of claim 10 wherein the step of computing the component portion of said reference trace R corresponding to said coherent signal COH is performed by computing the least square fit coefficient K of said coherent signal COH and said reference trace R according to the relationship $$K = \frac{\sum_{j=1}^{L} COH_j \cdot R_j}{\sum_{j=1}^{L} COH_j^2}$$

where the index j represents the j th point on the traces R and COH; and forming the coherent component portion R COMP of the reference signal $$R_j\, COMP = K \cdot R_j$$

where the index j again refers to the j th point on the trace R in said search window.

15. The method of claim 10 wherein the contribution of points on said reference trace R near the edges of said search window are minimized prior to beginning the computational steps of the method by tapering said reference trace R smoothly to zero at the window edges by application of a mathematical taper function F ($\theta$) of the form $$F(\theta) = \tfrac{1}{2}(1 + \cos\theta) \quad -180° \leq \theta \leq 180°$$

where $\theta$ represents the time dimension parameter of a seismic trace in said search window.

16. A machine implemented method for enhancing plural raw digital data records, not moveout corrected, said data having a coherent signal component comprising a measure of the similarity between spatially related time series data, and a noise component, and for improving the signal to noise ratio thereof, comprising the steps of:

compiling, from said plurality of raw data records, a synthetic data record of common range traces;

determining, for a search window defined about a selected time on a selected reference trace on said synthetic data record, the shape and amplitude of the coherent signal associated with said reference trace and a plurality of spacewise adjacent seismic traces on said synthetic record;

computing, as a function of the amplitude and shape of said coherent signal, the component portion of said selected reference trace corresponding to said coherent signal;

replacing, in time alignment on said synthetic data record, on an output signal record medium, the portion of said reference trace in said search window, with said coherent signal component portion;

repeating the above steps for other selected times and other selected reference traces until all data comprising said synthetic record is so processed; and repeating all the above steps for different common shotpoint-detector ranges, thereby enhancing the data on all of said raw data records.

17. The method of claim 16 and further including the step of, prior to performing the repeating step:

replacing, in time alignment with said reference trace on an output noise record medium, that portion of said reference trace included in said search window, with the remainder of said reference trace not comprising said coherent signal component portion.

18. The method of claim 16 wherein the step of determining the shape of said coherent signal is performed by:

cross-correlating a plurality of adjacent seismic traces X with the portion of said reference trace R in said search window and deriving a correlation coefficient $C_i$ according to the relationship $$C_i = \sum_{j=1}^{L} R_i \cdot X_i$$

where the index $j = 1$, L represents the number of digital data points on the reference trace R and the adjacent trace X in said search window, and the index i represents the i th such cross-correlation;

time skewing each of said adjacent traces X with respect to said reference trace into a plurality of preselected time alignments and repeating the cross-correlation step for each adjacent trace X at each such time alignment;

determining, for each adjacent trace X the time alignment which produces a maximum of the computed cross-correlation coefficients $C_i$ for a given adjacent trace X; and computing, as a function of said maximum coefficient time alignments for each adjacent trace X and of said reference trace R, the coherent signal component COH.

19. The method of claim 18 wherein the step of computing the coherent signal associated with said traces is performed according to the linear average relationship $$COH_j = \frac{A_i + B_i + R_j + D_i + E_i + \cdots}{N}$$

where the index i represents the index of the time alignment of each adjacent trace X = A, B, D, E - - - - which produces said maximum correlation coefficient C for that adjacent trace, the index j represents the j th data point in said search window on the reference trace R and the coherent signal COH.

20. The method of claim 16 wherein the step of computing the component portion of said reference trace R corresponding to said coherent signal COH is performed by computing the least square fit coefficient K of said coherent signal COH and said reference trace R according to the relationship $$K = \frac{\sum_{j=1}^{L} COH_j \cdot R_j}{\sum_{j=1}^{L} COH_j^2}$$

where the index j represents the j th point on the traces R and COH and forming the coherent component portion R COMP of the reference signal $$R_j\,COMP = K \cdot R_j$$

where the index j again refers to the j th point on the trace R in said search window 21. The method of claim 16 wherein the contribution of points on said reference trace R near the edges of said search window are minimized prior to beginning the computation of the method by tapering said reference trace R smoothly to zero at the window edges by application of a mathematical taper function F ($\theta$) of the form $$F(\theta) = \tfrac{1}{2}(1 + \cos\theta) \quad -180° \leq \theta \leq 180°$$

where $\theta$ represents the time dimension parameter of a seismic trace in said search window.

* * * * *